_United States Patent Office_

3,119,742
Patented Jan. 28, 1964

3,119,742
METHOD OF PREPARING SUSTAINED RELEASE PHARMACEUTICAL PELLETS AND PRODUCT THEREOF
Kenneth R. Heimlich, Ambler, and Donald R. MacDonnell, Radnor, Pa., assignors to Smith Kline & French Laboratories, Philadelphia, Pa., a corporation of Pennsylvania
No Drawing. Filed Dec. 19, 1962, Ser. No. 245,681
9 Claims. (Cl. 167—82)

This invention relates to the method of making high dosage sustained release orally administrable pharmaceutical pellets and the product of this method. More particularly this invention relates to the preparation of sustained release pellets coated with a time delay material which are to be encapsulated.

Prior to this invention the standard procedure for preparing sustained release pharmaceutical pellets consisted of coating substantially spherical innocuous cores with a medicament, dividing said coated cores into a plurality of groups, coating said groups with a slow digestible or dispersible time delay coating which provides different times of release of the medicament on ingestion, combining the pellets and encapsulating said pellets. The innocuous cores used for the above process may be, for example, sugar seeds, beads formed from synthetic resins or naturally occurring seeds such as rape seeds. The formulation of pelleted sustained release products by this prior art method has a major disadvantage in that it is limited to drugs of relatively small doses. This is caused by the necessity of using the spherical innocuous cores as starting material upon which the medicament is coated. The maximum medicament content of the finished pellet made by this process is about 70%. Thus, it can be seen that the encapsulation in hard gelatin capsules of a high dosage medicament in sustained release pellet form has been prohibitive because it necessitates a capsule too large for administration and pharmaceutical elegance.

The method and sustained release pellets in accordance with this invention allows for the incorporation of large doses of sustained release drugs in hard gelatin capsules for convenient dosing thus eliminating the disadvantages of the prior art. The invention is distinguished from prior methods of preparing sustained release pharmaceutical pellets in that the use of innocuous cores which was a necessity, is now completely eliminated. The present invention permits for the coating of the time delay material directly upon the crystals of medicament. The elimination of the innocuous cores now makes it possible to prepare a finished sustained release pellet having as high as 95% medicament present and thus makes it possible to put out a high unit dose in a hard gelatin capsule which is pharmaceutically elegant and of a size convenient for swallowing. For example, a #1 hard gelatin capsule holds approximately 400 mg. of finished sustained release pellets. This then means this capsule could contain a maximum of 280 mg. of medicament when the pellets are prepared by the prior art method. However, the novel process of this invention now permits the same #1 hard gelatin capsule to carry 380 mg. of active medicament. In brief, the process of this invention has increased by approximately 100 mg. the amount of medicament possible to be encapsulated in a #1 hard gelatin capsule.

The method of this invention comprises coating crystals of medicaments with additional medicament to produce smooth, spherical pellets, dividing said coated pellets into a plurality of groups, coating said groups with a slowly digestible or dispersible time delay coating to provide pellets of a diameter of from about 0.1 to about 2.0 mm. containing from about 85 to about 95% active medicament and providing different times of release of the medicament on ingestion, combining the pellets and encapsulating said pellets.

The formation of the smooth, spherical medicinal pellets from the crystals and the subsequent time delay coating of said spherical pellets is accomplished as described hereafter. The crystals of medicament are placed in a coating pan and while the pan is rotating a conventional adhesive coating solution used in the manufacture of tablets is slowly sprayed onto the crystals until they are all evenly wet. Additional powdered medicament is then slowly sprinkled over the wetted crystals until no more powder will adhere to the crystals and the crystals are allowed to dry while they are rolling by employing cold air. This process of spraying, adding powder and drying is continued until substantially smooth spherical pellets are formed and the desired amount of powdered medicament has been added. The formed pellets are then divided into two groups. One group is set aside and remains uncoated to serve as the initial dose and the other group is coated with time delay material. The time delay material is placed in solution and gently sprayed over the pellets of medicament which are rotating in a coating pan. The sustained release of the medicament is achieved by varying the thickness of the time delay coatings or alternatively by changing the constitution of the coatings. The various groups are then blended to meet the required release and encapsulated.

The core forming medicament in accordance with this invention may be any high dosage medicament. By a high dosage medicament is meant a solid medicament which is administered in a unit dosage amount of from about 200 mg. to about 600 mg. Thus the encapsulated pellets can contain from 200 mg. to about 600 mg. of medicament. By way of example, the medicament may be a tranquilizer such as chlorpromazine; a diuretic such as aminophylline; an antitussive such as dextromethorphan; an antibiotic such as tetracycline. Other types of medicaments can be employed in this novel process and pellet such as, for example, vitamins, hematinics, analgesics and antacids.

Most advantageously an antipyretic and analgetic such as acetaminophen or aspirin is utilized as the high dosage medicament. The medicament may be present from about 70 to about 95% by weight of the finished pellets, the lower limit being dependent on the desired dosage of the drug. Advantageously the active ingredient would be about 85 to about 95% by weight of the finished sustained release pellets.

The core forming medicament will be in a substantially cubical or spherical crystalline form ranging in size from about 20 to about 40 U.S. standard mesh. It will be understood that the medicament crystals must be in crystalline form suitable for coating operation in rotating pans. Substantially cubical or spherical crystals are exemplary of such forms. Advantageously the length of the crystal of medicament will not be more than two times the width of the crystal.

The time delay material is a substantially water insoluble material resistant to disintegration in the gastrointestinal tract and providing for a gradual release of the medicament in said tract. The time delay material may be, for example, a waxy, a fatty acid, alcohol or ester, alone, or an admixture thereof, or metallic salts of fatty acids.

The wax may be paraffin wax; a petrolatum wax; a mineral wax such as ozokerite, ceresin, Utah wax or montan wax; a vegetable wax such as, for example, carnauba wax, Japan wax, bayberry wax, flax wax; an animal wax such as, for example, spermaceti; or an insect wax such as beeswax, Chinese wax or shellac wax.

Additionally, the wax material may be an ester of a fatty acid having from 12 to 31 carbon atoms and a fatty alcohol having from 12 to 31 carbon atoms, the ester having a carbon atoms content of from 24 to 62, or a mixture thereof. Exemplary are myricyl palmitate, ceryl palmitate, ceryl cerotate, myricyl mellissate, stearyl palmitate, stearyl myristate, lauryl laurate.

The fatty acid may have from 10 to 22 carbon atoms and may be, for example, decenoic, docosanoic, stearic, palmitic, lauric or myristic acid.

The fatty alcohols may have from 10 to 22 carbon atoms and may be, for example, lauryl alcohol, cetyl, stearyl, myristyl, myricyl, arachyl, carnubyl or ceryl alcohol.

The esters may be mono-, di- or triglyceryl esters formed from fatty acids having from 10 to 22 carbon atoms, such as, for example, glyceryl distearate, glyceryl tristearate, glyceryl monostearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate, glyceryl tridecenoate, hydrogenated castor oil, hydrogenated peanut oil and hydrogenated coconut oil.

Exemplary of metallic salts of fatty acids would be the aluminum or magnesium salts of fatty acids ranging from 8 to 18 carbon atoms.

The preferred sustained release materials are hydrogenated castor oil, glyceryl monostearate, glyceryl distearate, 12 hydroxy stearyl alcohol and microcrystalline wax.

The sustained release coating material as outlined above is present from about 4 to about 20% by weight of the total solids. Preferably the time delay material is present from about 5 to about 10%.

In order to make a solution of the coating material, a suitable solvent, such as, for example, carbon tetrachloride, methyl and ethyl alcohol, ethylene dichloride, naphtha, benzene trichloroethylene, isopropyl alcohol, acetone, can be used. Both the fat or wax-fat material and the solvent are heated to a temperature within the range of from 50 to 80° C., being careful not to heat the solvent selected to a temperature higher than 10° C. below its boiling point, and then admixed to form the wax-fat coating composition.

The adhesive wetting solution used in the process of this invention may be any standard solution used in the coating art such as, for example, syrup in water, acacia in water, gelatin in water or an aqueous or organic solution of polyvinylpyrrolidone. If desired a coloring solution may also be applied.

The product of the thus outlined process comprises both an immediate and sustained release form of pharmaceutical pellets in dosage unit form, as for example, in capsule form. The immediate release pellets comprise therapeutically active medicinal core and the sustained release pellets comprise said cores coated with a pharmaceutically acceptable sustained release lipid material resistant to disintegration and slowly dispersible in the gastrointestinal tract providing a smooth 8 hour release pattern which yields therapeutic activity from a 10 to 12 hour period.

It will be apparent to those skilled in the pharmaceutical art that methods and material equivalent to those described herebefore could be used such as using air suspension or fluid bed coating methods. Also certain prior art coating methods do not require a distinct group of uncoated pellets for immediate release of medicament. Such obvious equivalents are included in this invention.

The following example is not limiting but is used to make obvious to one skilled in the art the full practice of the method of this invention.

EXAMPLE

Acetaminophen, N.F., crystalling _____gm__ 7,500
Acetaminophen, N.F., powdered _____gm__ 12,500

PVP Adhesive Coating Solution

Polyvinylpyrrolidone _____gm__ 700
S.D. alcohol #30, q.s. 10,000 ml.

Dissolve the polyvinylpyrrolidone in the alcohol.

Coloring Solution

FD & C Red #3 _____gm__ 3.12
Syrup, U.S.P. _____ml__ 100.00
Water, U.S.P. _____ml__ 100.00
S. D. alcohol #30, q.s. 500.00 ml.

Dissolve the dye in the water and add the syrup and alcohol.

Microcrystalline Wax Coating Solution

Microcrystalline wax _____gm__ 400
Carbon tetrachloride, N.F. _____ml__ 3,600

The wax is melted and the carbon tetrachloride is added to the melted wax with caution with continued heating and stirring until a clear solution results.

Glyceryl Distearate Coating Solution

Glyceryl distearate _____gm__ 500
Carbon tetrachloride, N.F. _____ml__ 2,830

The glyceryl distearate is melted and the carbon tetrachloride is cautiously added to the melted mixture with combined heating and stirring until a clear solution results.

The acetaminophen crystals (20–40 mesh) are placed in a 24" coating pan. While rotating the pan the PVP adhesive solution is sprayed onto the crystals until they feel damp. Approximately 250 gms. of the acetaminophen powder is then sprinkled on the crystals and the crystals are allowed to roll until dry. Continue spraying and adding the powdered acetaminophen until all has been applied. One or two sealing coats of the PVP solution are then sprayed on and the pellets are allowed to roll until dry. The pellets are then screened through a #16 U.S. standard screen onto a #25 U.S. standard screen.

Approximately ½ of the above formed substantially spherical pellets are placed in a coating pan and 160 ml. of the coloring solution is applied to the rolling pellets. The pellets are allowed to roll until nearly dry and more coats of coloring solution are applied until the desired color is obtained. These pellets are dried and blended with the uncolored (white) pellets.

Approximately 40% of the blended pink and white pellets are set aside to be used as an immediate release group. The remainder of the pellets are sprayed with the microcrystalline wax coating solution at about 60–65° C. and 45 p.s.i. pressure. The spraying is continued until a 2.5% increase in weight of microcrystalline wax is applied and the pellets are then dried.

The microcrystalline wax coated pellets are then placed in a suitable coating pan and overcoated with glyceryl distearate by spraying at 50–55° C. and 45 p.s.i. pressure. The spraying is continued until a 3.5% increase in weight of glyceryl distearate is applied and the pellets are allowed to dry.

The coated and uncoated pellets are blended and checked for release rate specification. If release rate specifications are not met additional coats of glyceryl distearate may be added.

All the pellets are then blended and filled into a #1 white opaque hard gelatin capsule so that each capsule contains 325 mg. of acetaminophen.

What is claimed is:

1. The method of preparing sustained release orally administrable pharmaceutical pellets containing a unit dosage amount of from about 200 mg. to about 600 mg. of a high dosage medicament which comprises:
 (a) wetting a medicament in substantially spherical crystalline form rotating in a coating pan with an adhesive solution,
 (b) coating said wetted crystalline medicament with additional powdered medicament to form substantially smooth, spherical pellets,
 (c) drying and separating said pellets into a plurality of groups,
 (d) coating at least one of said group of pellets with a pharmaceutically acceptable sustained release lipid material resistant to disintegration and slowly dispersible in the gastrointestinal tract, and
 (e) blending said groups.

2. The method of claim 1 characterized in that the length of the crystalline medicament is not more than two times the width of the crystal.

3. The method of claim 1 characterized in that the blended groups of pellets are encapsulated.

4. The method of claim 1 characterized in that the sustained release lipid material is present from about 5% to about 10% by weight of the total solids.

5. The method of claim 1 characterized in that the high dosage medicament is acetaminophen.

6. A pharmaceutical preparation in dosage unit form containing from about 200 mg. to about 600 mg. of high dosage medicament comprising an ingestible capsule containing immediate and sustained release pharmaceutical pellets of said high dosage medicament, said immediate release pellets comprising substantially pure therapeutically active medicament and said sustained release pellets comprising substantially pure therapeutically active medicinal cores coated with a sustained release lipid material resistant to disintegration and slowly dispersible in the gastrointestinal tract to maintain a therapeutic level of said medicament over an extended period of time.

7. The pharmaceutical preparation of claim 6 characterized in that the sustained release lipid material is present from about 5% to about 10% by weight of the total solids of said pellets.

8. The pharmaceutical preparation of claim 6 characterized in that the medicament is present from about 85% to about 95% of the total solids of said pellets.

9. The pharmaceutical preparation of claim 6 characterized in that the high dosage medicament is acetaminophen.

References Cited in the file of this patent

UNITED STATES PATENTS

| 2,738,303 | Blythe | Mar. 13, 1956 |
| 2,793,979 | Svedres et al. | May 28, 1957 |
| 2,921,883 | Reese et al. | Jan. 19, 1960 |

OTHER REFERENCES

U.S. Dispensatory, 25th edition, parts II–III, J. B. Lippincott Co., Philadelphia, Pa. (1955), p. 1524.